United States Patent
Lee et al.

(10) Patent No.: US 7,619,842 B2
(45) Date of Patent: Nov. 17, 2009

(54) METHOD OF DETERMINING OPTIMAL WRITE CURRENT PARAMETERS OF MAGNETIC RECORDING DEVICE AND STORAGE DEVICE USING THE METHOD

(75) Inventors: Joo-hyun Lee, Suwon-si (KR); Ji-young Lee, Yongin-si (KR); Myoung-mee Kim, Selngnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 11/736,152

(22) Filed: Apr. 17, 2007

(65) Prior Publication Data
US 2007/0263309 A1 Nov. 15, 2007

(30) Foreign Application Priority Data
May 9, 2006 (KR) ...................... 10-2006-0041628

(51) Int. Cl.
*G11B 27/36* (2006.01)
(52) U.S. Cl. ...................................... 360/31
(58) Field of Classification Search ................. 360/31, 360/25, 27, 39, 46, 53, 75
See application file for complete search history.

(56) References Cited

U.S. PATENT DOCUMENTS

| | | | | |
|---|---|---|---|---|
| 5,568,465 | A * | 10/1996 | Hutchins et al. | 369/59.15 |
| 6,633,444 | B2 * | 10/2003 | Uno et al. | 360/46 |
| 6,870,697 | B2 * | 3/2005 | Ikekame et al. | 360/46 |
| 6,972,920 | B2 * | 12/2005 | Kim et al. | 360/75 |
| 7,154,687 | B2 * | 12/2006 | Ikekame et al. | 360/46 |
| 7,411,756 | B2 * | 8/2008 | Wilson et al. | 360/66 |
| 7,502,205 | B1 * | 3/2009 | Hurtado et al. | 360/294.7 |

FOREIGN PATENT DOCUMENTS

| | | |
|---|---|---|
| JP | 2001-273603 | 10/2001 |
| KR | 2004-52031 | 6/2004 |

* cited by examiner

*Primary Examiner*—Fred Tzeng
(74) *Attorney, Agent, or Firm*—Stanzione & Kim LLP

(57) ABSTRACT

Optimal write current of a data storage device is determined by writing test data with an initial write condition and evaluating a performance related to the pole tip protrusion (PTP) of a magnetic head. A PTP control duration is determined as a duration between where the test data is initially written and where a performance evaluation value begins to satisfy a threshold criterion. An overshoot value of a PTP control signal that determines an overshoot amplitude of a write current and a PTP control duration are determined by for writing subsequent data such that PTP-related data errors are substantially constant regardless of write time.

28 Claims, 8 Drawing Sheets

ROTATIONAL DIRECTION OF HARD DISK

ROTATIONAL DIRECTION OF HARD DISK

902

METHOD OF DETERMINING OPTIMAL WRITE CURRENT PARAMETERS OF MAGNETIC RECORDING DEVICE AND STORAGE DEVICE USING THE METHOD

CROSS-REFERENCE TO RELATED APPLICATIONS

This application claims the benefit of priority under 35 U.S.C. §119(a) of Korean Patent Application No. 10-2006-0041628, filed on May 9, 2006, in the Korean Intellectual Property Office, the disclosure of which is incorporated herein by reference in its entirety.

BACKGROUND OF THE INVENTION

1. Field of the Invention

The general inventive concept described herein through illustrative embodiments thereof relates to optimizing a write current in a data storage device, and more particularly, to a method and apparatus to determine optimal parameters for a write current while taking the pole tip protrusion (PTP) of a magnetic head into consideration.

2. Description of the Related Art

Conventionally, hard disk drives (HDDs), which are data storage devices, were originally used in computer systems to read data from and write data to a disk using a magnetic head. In recent years, however, HDDs are found in a wide variety of applications, such as digital video recording equipment and personal media players.

In HDDs, a typical magnetic recording head is made of metal and a slider supporting the magnetic head is made of a non-metallic material. When a write current flows through a metal coil of the magnetic head, a magnet flux is generated for writing data on a suitable disk. Also, since the coil includes a finite resistance, the write current flowing through the coil generates Joule heat. As a consequence of the generated heat and a difference between the coefficients of thermal expansion of the magnetic head made of metal and the slider made of the non-metallic material, the structure forming a pole of the magnetic head is caused to protrude. Such a phenomenon is referred to as "pole tip protrusion" (PTP).

In general, there is a difference in temperature between a point in time when a write operation starts and a point in time when the write operation ends. That is, since the temperature of the magnetic head at the time when the write operation starts is lower than the temperature of the magnetic head at the time when the write operation ends, the amount of PTP at the time when the write operation starts is less than that at the time when the write operation ends.

Due to the variance in the amount of PTP over time, a space between the magnetic head and a disk, referred to herein as the "flying height," is not constant. If the flying height of the magnetic head decreases to less than a lower limit, the magnetic head and the disk may collide with each other, thereby resulting in damage to one or both of the magnetic head and disk and/or overheating the magnetic head to render it at least temporarily inoperative, which is a condition known in the art as thermal asperity (TA). On the other hand, if the flying height of the magnetic head is greater than an upper limit, the magnetizing force at the surface of the disk may be diminished to the point where it is difficult to properly write data.

In particular, thermal PTP (TPTP) of the magnetic head when the write operation starts is generally at a minimum, which may lead to poor initial recording quality if the magnetic flux during the write operation has been optimized to a flying height corresponding to when TPTP has occurred.

To solve these and other problems, the present applicant has disclosed Korean Patent Application No. 2002-79751, filed on Dec. 13, 2002, entitled "Method of Measuring TPTP of Magnetic Head and Method of Controlling Write Current Thereof."

Although a method of measuring the TPTP of a magnetic head is explained in detail in the cited reference, a method of precisely determining a PTP control duration over which an overshoot amplitude of a write current is controlled has not been developed. Consequently, the "overshoot value" of the write current, i.e., the peak amplitude of the write current during the write operation, cannot be effectively controlled considering PTP.

Thus, as higher capacity, higher density, and smaller HDDs are developed, there is a demand for a precise method of determining a PTP control duration over which a PTP control signal controls an overshoot amplitude of a write current considering PTP.

SUMMARY OF THE INVENTION

The present general inventive concept provides a method of determining optimal values for a write current of a magnetic recording device, and which can optimize the write current considering the pole tip protrusion (PTP) of a magnetic head.

The present general inventive concept also provides a disk drive using the method.

The present general inventive concept also provides a computer-readable recording medium having embodied thereon a program for the method.

Additional aspects and advantages of the present general inventive concept will be set forth in part in the description which follows and, in part, will be apparent from the description, or may be learned by practice of the general inventive concept.

The foregoing and/or other aspects and utilities of the general inventive concept are achieved by providing a method of determining optimal values for a write current of a magnetic recording device, the method including writing test data with an initial write condition and evaluating a performance related to the pole tip protrusion (PTP) of a magnetic head to detect a write sector where a performance evaluation value thereof begins to satisfy a threshold criterion, determining, as a PTP control duration, a duration between a write start sector where the test data is initially written and a sector immediately preceding the write sector where the performance evaluation value begins to satisfy the threshold criterion, varying an overshoot value of a PTP control signal that determines an overshoot amplitude of a write current and evaluating the PTP-related performance by applying the varied overshoot value of the PTP control signal over the determined PTP control duration, and selecting an overshoot value of a PTP control signal when a PTP-related performance evaluation value measured in the PTP control duration is most similar to a PTP-related performance evaluation value measured outside the PTP control duration.

An overshoot amplitude of an initial write current used in the test data writing operation may be determined as an optimal value obtained outside the PTP control duration.

The PTP-related performance evaluation factors may include a bit error rate (BER) and a channel statistic measurement (CSM).

The test data writing operation may include writing test data with an initial write current in a specific region of a disk, reading the test data from a write start sector where the test data is initially written and evaluating the performance related to the PTP of a magnetic head, and detecting the write sector where a performance evaluation value begins to satisfy a threshold criterion.

The threshold criterion may be satisfied when a difference between an average BER or CSM calculated from a sector where the PTP of a magnetic head is in a steady state and a BER or CSM calculated from the write start sector is less than an initial threshold value.

The write sector where the performance evaluation value begins to satisfy the threshold criterion may be determined when a plurality of contiguous sectors satisfies the threshold criterion.

The test data reading operation may include evaluating the PTP-related performance using a plurality of sectors as a unit as offset by one sector at a time.

The foregoing and/or other aspects and utilities of the general inventive concept are also achieved by providing a disk drive including a disk on which information is stored, a magnetic head to magnetize the disk and to sense a magnetic field from the disk, a controller to determine a PTP control duration and an overshoot value of a PTP control signal to control an overshoot amplitude of a write current so that a performance related to the PTP of the magnetic head can be substantially constant from a write start sector irrespective of a write time that has elapsed, and a pre-amplifier to generate a write current having an overshoot amplitude determined by the value of the PTP control signal at a corresponding write time and to supply the generated write current to the magnetic head in a write mode, and to amplify an electrical signal sensed from the magnetic head in a read mode.

The foregoing and/or other aspects and utilities of the general inventive concept are also achieved by providing a computer-readable recording medium having embodied thereon a program for the above method.

The foregoing and/or other aspects and utilities of the general inventive concept are also achieved by providing a method of ameliorating PTP effects of a magnetic head on data written to a magnetic medium, the method including writing test data on the magnetic medium with the magnetic head in an initial PTP state, the magnetic head provided a write current corresponding to a steady state of the PTP, reading the test data with the magnetic head and determining therefrom a write time dependency of a quality of the test data, and controlling the write current supplied to the magnetic head for writing subsequent data in accordance with the write time dependency of the quality of the test data.

The foregoing and/or other aspects and utilities of the general inventive concept are also achieved by providing a magnetic storage device including a magnetic medium to store data thereon, a magnetic head in spaced apart relationship with a surface of the magnetic medium to provide a magnetic flux at the surface of the magnetic medium to define the data thereon, the magnetic flux at the surface of the magnetic medium having a time-dependent variation when a constant current in provided to the magnetic head, and a controller to determine the time-dependent variation of the magnetic flux and to control an amount of current provided to the magnetic head over time so that the magnetic flux at the surface of the magnetic medium remains substantially constant at the surface of the magnetic medium.

BRIEF DESCRIPTION OF THE DRAWINGS

These and/or other aspects and utilities of the present general inventive concept will become apparent and more readily appreciated from the following description of the illustrative embodiments, taken in conjunction with the accompanying drawings of which.

DETAILED DESCRIPTION OF THE PREFERRED EMBODIMENTS

Figure 1:
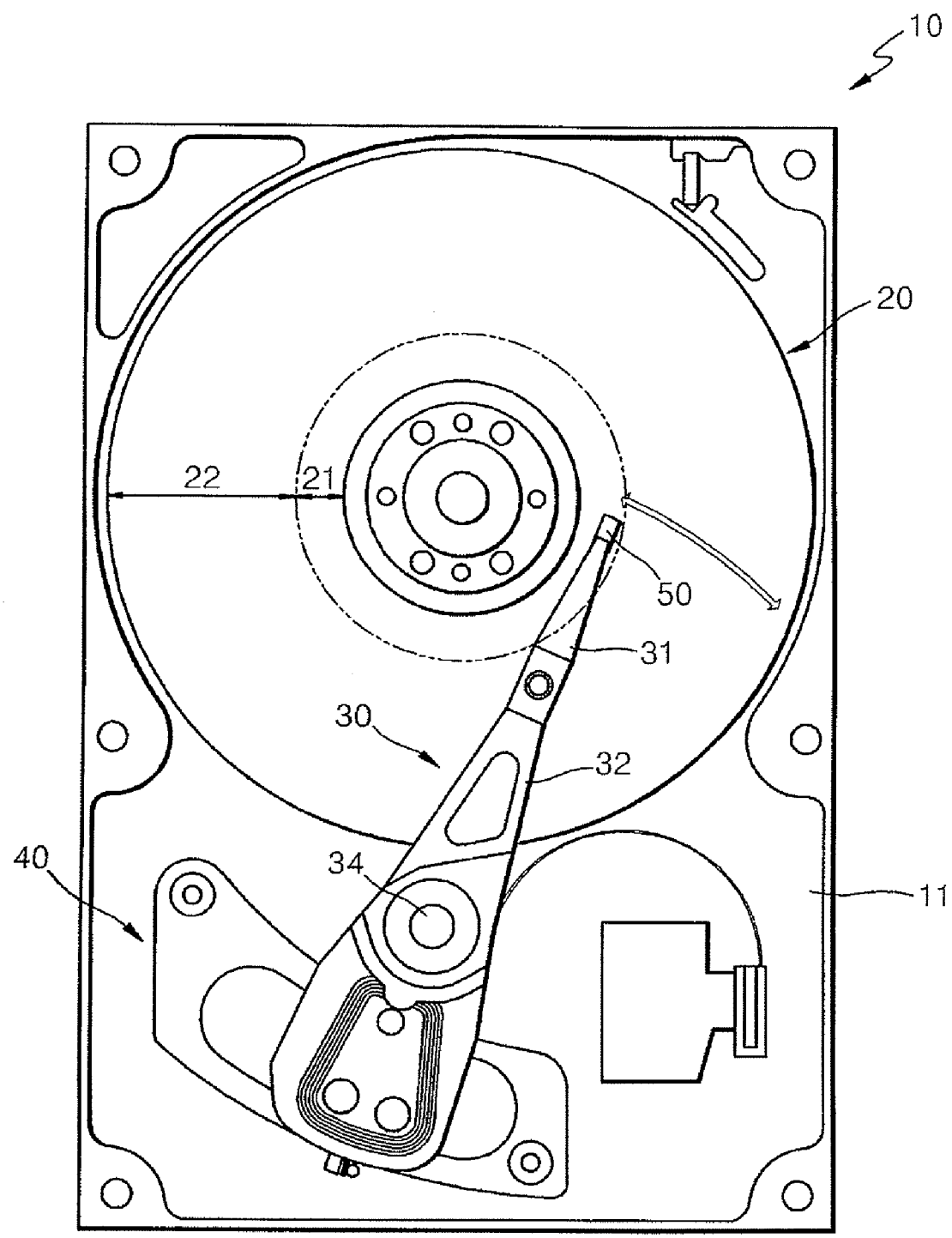
FIG. 1 is a plan view illustrating a conventional hard disk drive (HDD) system.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Typically, hard disk drives (HDDs) include a head disk assembly (HDA) comprising various mechanical parts, and an electrical circuit assembly operative with the HDA and to perform other various functions, such as to interface with a host device.

FIG. 1 is a plan view illustrating an exemplary HDA 10 of an HDD. It is to be understood that the present general inventive concept is not limited to the structural details and concomitant functions of the exemplary HDA 10 and numerous other HDA configurations are considered to fall within the scope of the inventive concept, as will be appreciated by the skilled artisan upon full review of this disclosure.

As is illustrate in the FIG. 1, the exemplary HDA 10 includes a base 11, a disk 20 rotatably installed on the base 11, such as through a spin motor (not illustrated), and which allows information to be magnetically encoded thereon, and a magnetic head moving mechanism to move a magnetic head slider 50 to a desired track of the disk 20 so as to write information to or read information from the disk 20. The disk 20 may include a recording area 22 on which information is recorded, and a parking area 21 on which the magnetic head slider 50 comes to rest when the disk 20 stops rotating, such as when power is removed from the HDD, and where the magnetic head slider 50 remains until the HDD is reactivated.

It is to be understood that more than one disk 20 may be included in the HDA 10 and that each disk 20 may have more than one magnetic head mechanism. For example, each disk 20 may have a magnetic head on each side thereof to read data therefrom and write data thereto. Moreover, each disk 20 may have multiple magnetic heads on each side thereof to access respective assigned regions of the disk 20. The present general inventive concept encompasses all such configurations, as will be appreciated by the skilled artisan upon complete review of this disclosure.

The magnetic head moving mechanism may include a magnetic head assembly 30 on which the magnetic head slider 50 is mounted. In the exemplary embodiment shown, the magnetic head assembly 30 rotates about a rotation axis 34 installed on the base 11, and an actuator 40 conducts the rotation of the magnetic head assembly 30 through, for example, an electromagnetic force. It is to be understood, however, that other actuator mechanisms may be implemented and the general inventive concept is not limited to a particular actuator type.

The exemplary magnetic head assembly 30 includes a suspension 31 extending from an end of an actuator arm 32 rotatably coupled to the rotation axis 34. The magnetic head slider 50 includes a magnetic head (not illustrated) to write information to and read information from the disk 20, where the slider 50 is mechanically and electrically installed at the distal end of the suspension 31.

The magnetic head slider 50 may be mechanically biased toward the disk 20 by a biasing force applied by the suspension 31. The disk 20 is rotated at high speed and the magnetic head slider 50 flies above the disk 20 due to a pneumatic pressure generated by the rotating disk 20.

When the magnetic head slider 50 flies above the disk 20 during the rotation of the disk 20, the flying height FH of the magnetic head slider 50 manifests itself as a gap between a surface of the disk 20 and a read sensor, which may be, for example, a magneto-resistive (MR) head. The gap is generally minimum when measured at a front end of the magnetic head slider 50.

Figure 2:
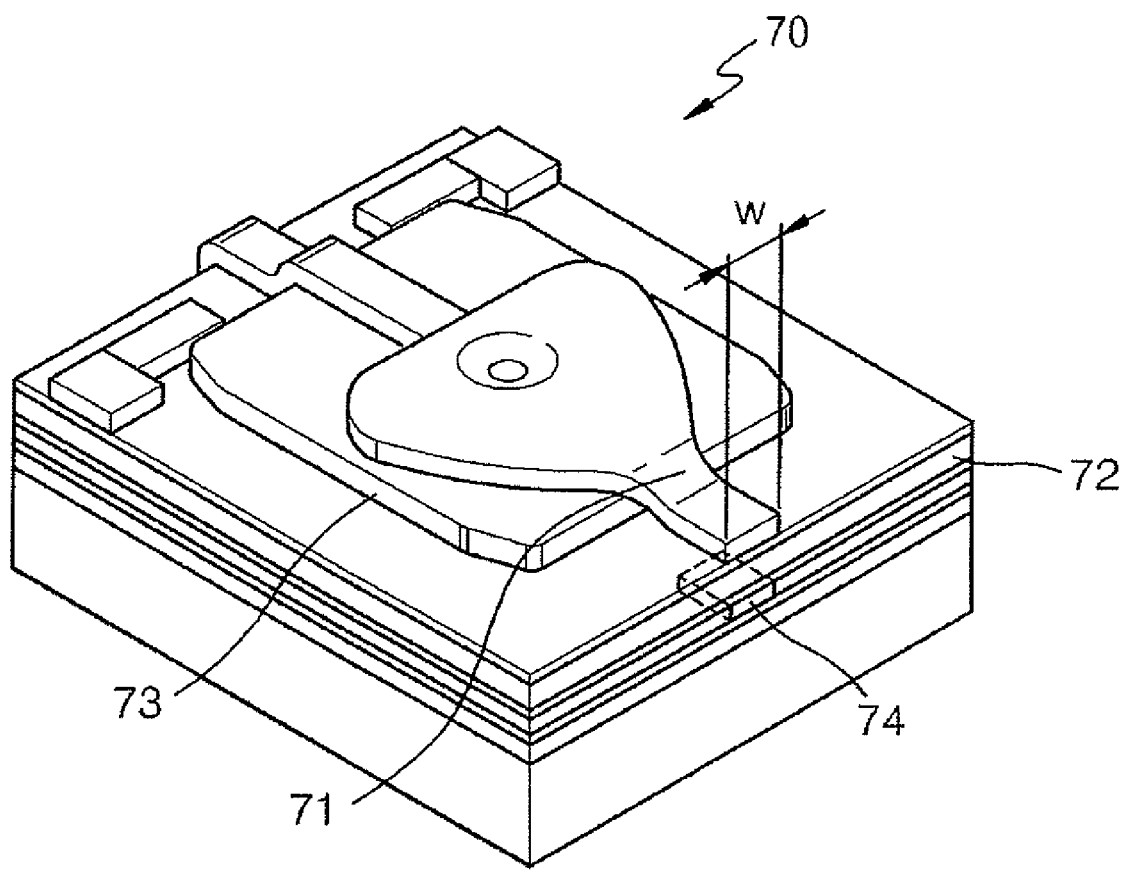
FIG. 2 is an enlarged perspective view illustrating a conventional magnetic head.

FIG. 2 is an enlarged perspective view of an exemplary magnetic head 70 mounted on the magnetic head slider 50. Referring to FIG. 2, the magnetic head 70 includes an MR head 74 to read data, and an inductive recording head to write data. The MR head 74 senses minute magnetic fields from microscopic magnetic regions on the disk 20, which form the magnetic signal recorded on the disk 20. The inductive recording head magnetically orients the microscopic regions to write a desired magnetic signal to the disk 20. The magnetic head 70 may include a top pole 71 and a bottom pole 72 to define a gap at which a leakage magnetic flux is generated to magnetize the disk 20. The magnetic head 70 may also include a recording coil 73 that generates a magnetic field when an electric current is supplied thereto.

Recently, to increase recording capacity, the tracks per inch (TPI) of the disk 20 has increased and, correspondingly, the track width W of the disk 20 has decreased.

In order to decrease the track width W of the disk 20, the width of the inductive recording head may be reduced and the FH of the magnetic head 70 may be lowered to read a magnetic field from the narrower track.

However, lowering the flying height FH of the magnetic head 70, by definition, requires a reduction in the distance between the magnetic head slider 50 and the disk 20. Such reduction carries with it a danger that the magnetic head slider 50 and the disk 20 may collide with each other in what is typically referred to in the art as a "head crash." Consequently, the magnetic head 70 and/or the disk 20 may be damaged.

Figure 3A:
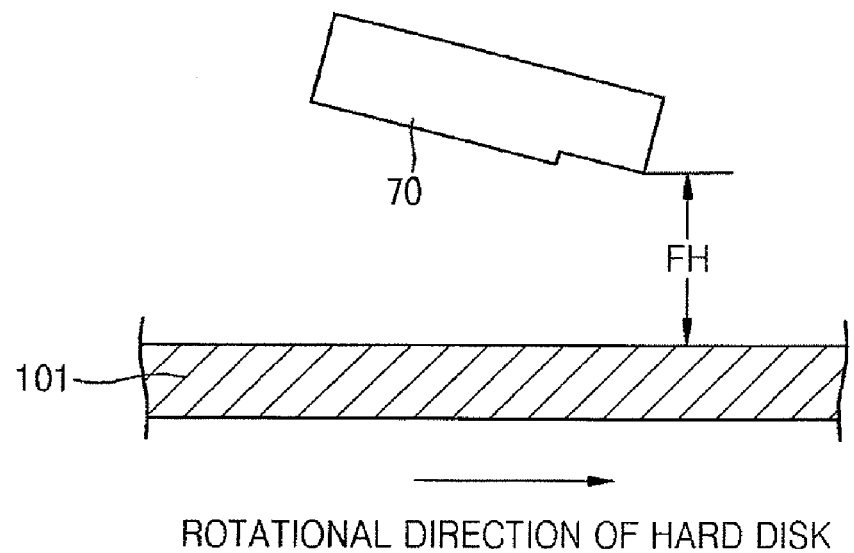
FIGS. 3A and 3B illustrate a change in the flying height of a magnetic head due to pole tip protrusion (PTP)
Figure 3B:
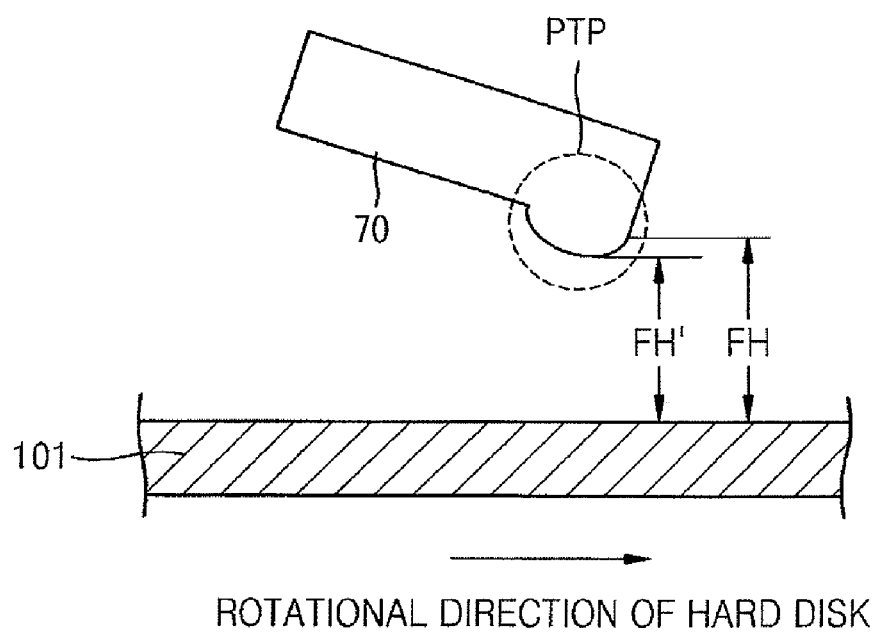

FIGS. 3A and 3B illustrate a change in the flying height FH of the magnetic head 70 as a result of a pole tip protrusion (PTP) effect.

FIG. 3A illustrates the flying height FH of the magnetic head 70 during a read operation and FIG. 3B illustrates a flying height FH' of the magnetic head 70 during a write operation. A write pole of the magnetic head 70 illustrated in FIG. 3B protrudes more than that of the magnetic head 70 illustrated in FIG. 3A. As described previously, the protrusion of the write pole of the magnetic head 70 is caused by a difference between the coefficients of thermal expansion of the magnetic head slider 50 that is made of a non-metallic material and the magnetic head 70 that is made of metal. The protrusion of the write pole of the magnetic head 70 reduces the flying height FH of the magnetic head 70 and may cause the magnetic head 70 to collide with the disk 20 in a worst-case scenario, thereby causing damage to the head pole and thermal asperity (TA).

The amount of PTP is proportional to $i^2R$, where i denotes a write current flowing through the recording coil 73 and R denotes the resistance of the recording coil 73.

In certain designs of an HDD, the write current is set in consideration of a target flying height FH of the magnetic head 70 after the write pole has reached steady-state protrusion.

In such designs, the write pole does not protrude to the intended extent during an initial write operation, and the flying height FH of the magnetic head 70 is thus higher than the target flying height FH. Consequently, the magnetizing force at the surface of the disk 20 is not at the designed level at the onset of a write operation, thereby lowering data write quality in those areas so written.

To solve this and other problems, the present general inventive concept provides a method of controlling an overshoot amplitude of a write current.

The present general inventive concept provides a method of precisely determining an optimal PTP control duration during an initial write operation and an optimal overshoot value of a PTP control signal to control the overshoot amplitude of a write current in accordance with the characteristics of a particular disk drive.

Figure 4:
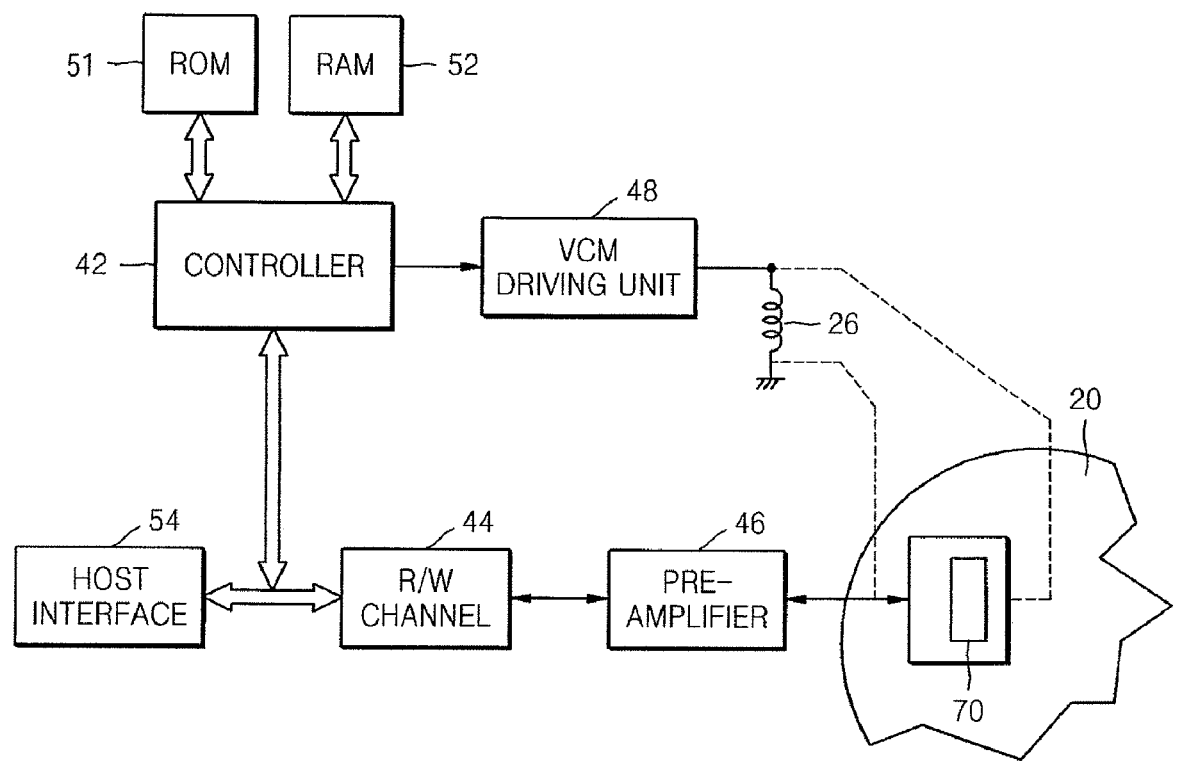
FIG. 4 illustrates an schematic block diagram of a disk drive to implement an embodiment of the present general inventive concept.

FIG. 4 illustrates a schematic block diagram of an exemplary electrical system to control an HDD according to an embodiment of the present general inventive concept. It is to be understood that the functional elements of the exemplary electrical system of this embodiment as illustrated and described may be reconfigured to combine elements or to distribute functionality among other components. The present general inventive concept is not limited to a particular configuration of the electrical system for operation of the HDD.

The exemplary electrical system of the HDD includes a controller 42 coupled to the magnetic head 70 via a read/write (R/W) channel circuit 44 and a pre-amplifier 46.

The controller 42 may be any circuit to carry the control functions of the HDD and to carry out aspects of the general inventive concept as described further below. For example, the controller 42 may be a digital signal processor (DSP), a microprocessor, or a microcontroller, where the control functions and various processes of the inventive concept are embodied as processor instructions executable on such a DSP, microprocessor or microcontroller. Among its duties, the controller 42 controls the R/W channel circuit 44 to read information from or to write information to the disk 20 according to a command received from a host device (not shown) via a host interface circuit 54. The controller 42 also directs the R/W channel circuit 44 to create the appropriate level of write current in the preamplifier circuit 46.

As is illustrated in FIG. 4, the exemplary controller 42 is also coupled to a voice coil motor (VCM) driving unit 48 that supplies a driving current to a voice coil 26. The controller 42 applies a control signal to the VCM driving unit 48 to control the movement of the magnetic head 70. Of course, if another actuation to move the magnetic head 70 is implemented, the control signal would be adapted as appropriate.

In accordance with certain embodiments of the present general inventive concept, the controller 42 executes a method of determining an optimal PTP control duration and an optimal overshoot value of a PTP control signal considering the PTP of each disk drive. The controller 42 performs operations described below with reference to the exemplary programs illustrated in FIGS. 5 and 6. In certain embodiments, the processor instructions to execute the exemplary programs are stored in a read-only memory (ROM) 51. In the illustrated embodiment, the controller 42 controls the overshoot amplitude of a write current for the determined optimal PTP control duration and with the optimal overshoot value of the PTP control signal.

Processes to control the disk drive and various control data may be embodied as firmware stored in the ROM 51. The exemplary programs illustrated in FIGS. 5 and 6 to execute the method of determining the optimal values for the write current may also be stored in the ROM 51. Additional information may be stored on a maintenance cylinder of the disk 20.

When power is supplied to the disk drive, the information stored on the maintenance cylinder of the disk 20 of the disk drive may be read into a random access memory (RAM) 52.

The operation of the exemplary disk drive will now be explained.

In a read mode, the pre-amplifier 46 of the disk drive amplifies, by a fixed gain value, an electrical signal produced by the magnetic head 70 responsive to magnetic fields sensed from the disk 20. Next, the R/W channel circuit 44 converts the electrical signal read from the disk 20 into a digital signal according to a sector pulse generated by the controller 42, and decodes the digital signal. The controller 42 performs error correction on the digital signal using, for example, a Reed-Solomon Code to convert the digital signal into stream data, and transmits the stream data to the host device via the host interface circuit 54.

In a write mode, the disk drive receives data from the host device via the host interface circuit 54, the controller 42 adds error correction parity symbols of the Reed-Solomon Code to the received data, the R/W channel circuit 44 encodes the data to data suitable for a write channel, and the magnetic head 70 writes the data to the disk 20 using a write current amplified by the pre-amplifier 46 when a sector pulse is generated by the controller 42. The write current is directed through the recording coil 73 to produce a magnetic field in the magnetic head 70.

Figure 9:
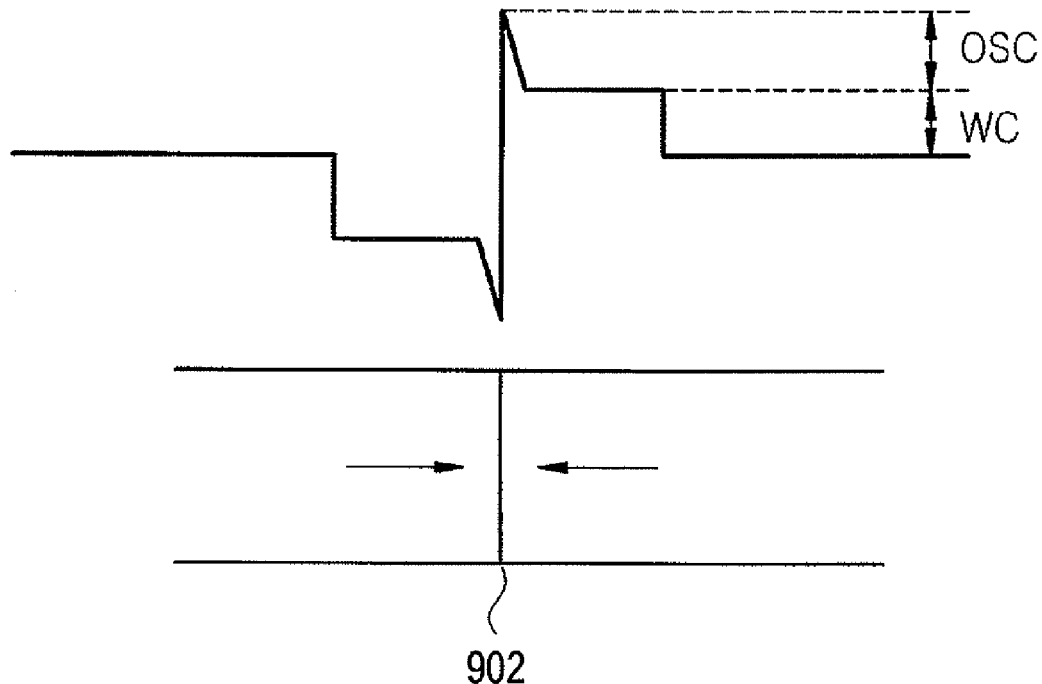
FIG. 9 is a waveform diagram of a write current to illustrate an overshoot current controlled by a PTP control signal.

Referring momentarily to FIG. 9, there is illustrated an exemplary waveform of the write current for purposes of describing aspects of the general inventive concept below. In the upper portion of the FIG. 9, a write current waveform is illustrated and in the lower portion of FIG. 9, a section of a corresponding track on disk 20 is illustrated. In the exemplary embodiment as illustrated, data is written by forming a localized magnetic dipole in the magnetically orientable regions of the disk 20. This may be achieved by rapidly reversing the direction of the write current flowing through the recording coil 73 at a predetermined bit position 902. In certain embodiments, the presence of such a magnetic dipole at the bit position 902 indicates a binary value of one (1) and the absence of a magnetic dipole at the predetermined bit position 902 indicates a binary value of zero (0).

As is illustrated in FIG. 9, an overshoot current OSC is induced on each side of position 902 to a level that produces a magnetic field equal to or greater than the coercivity of the magnetic medium on the disk 20. In the regions on opposing sides of the bit position 902, a write current amplitude of WC maintains a magnetic field to slightly less than the coercivity of the medium. The overshoot current OSC is a primary source of the heat that produces PTP and its level is also an essential factor in the proper recording of data. At the beginning of a write operation, for example, prior to the onset of PTP, the flying height will be greater than when PTP is in effect and it should be clear to the skilled artisan that the magnetic field at the surface of the disk 20 may thus be less than the coercivity of the medium and the data may be written insufficiently. Accordingly, it is an aspect of the general inventive concept to control the level of the overshoot current OSC in accordance with the amount of PTP at any given moment in time.

A method of determining optimal values for a write current under the control of the controller 42 according to embodiments of the present general inventive concept will now be explained with reference to FIGS. 5 and 6.

Figure 5:
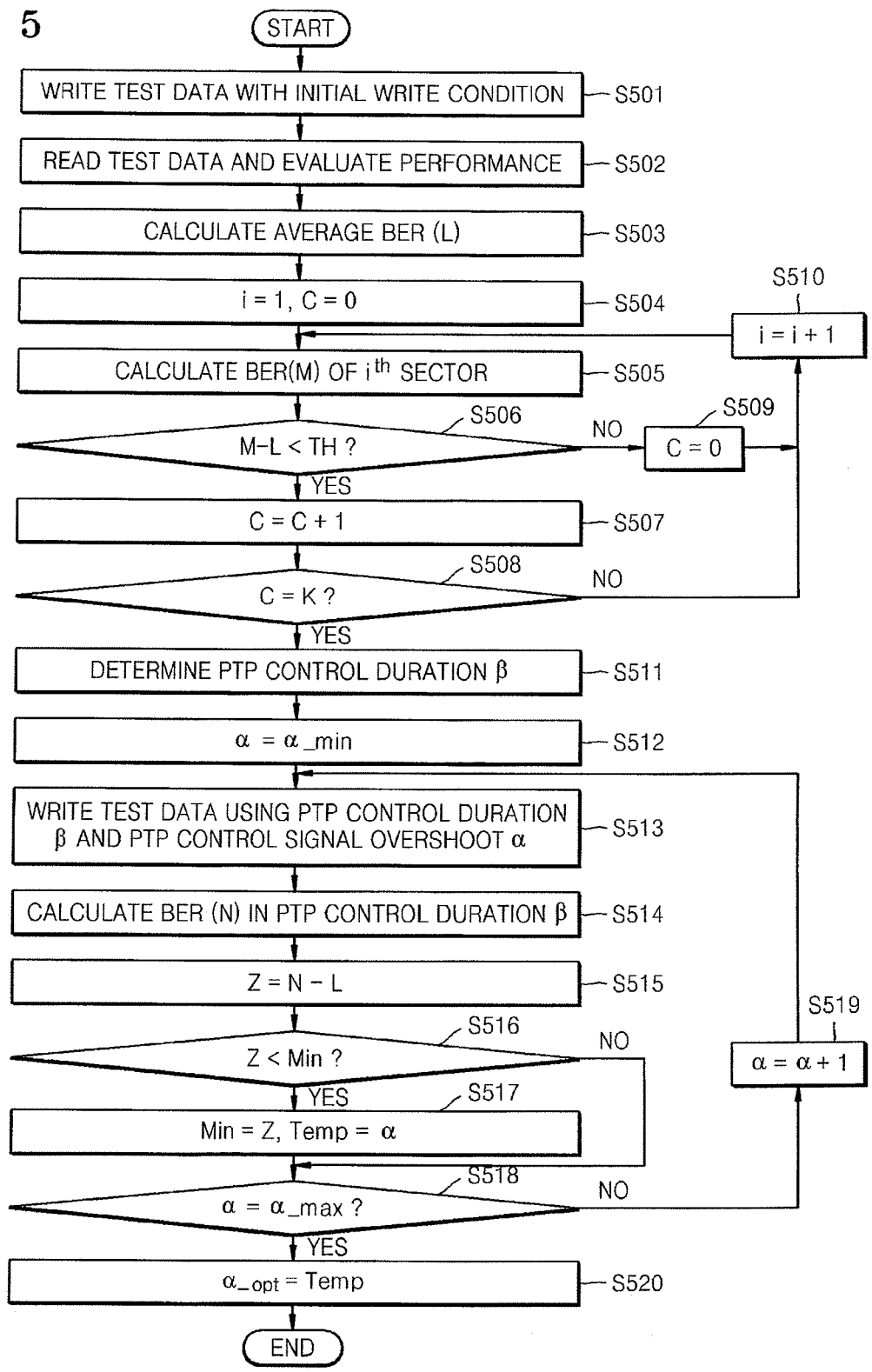
FIG. 5 is a flowchart illustrating an exemplary method of determining optimal values for a write current of a magnetic recording device according to an embodiment of the present general inventive concept.
Figure 6:
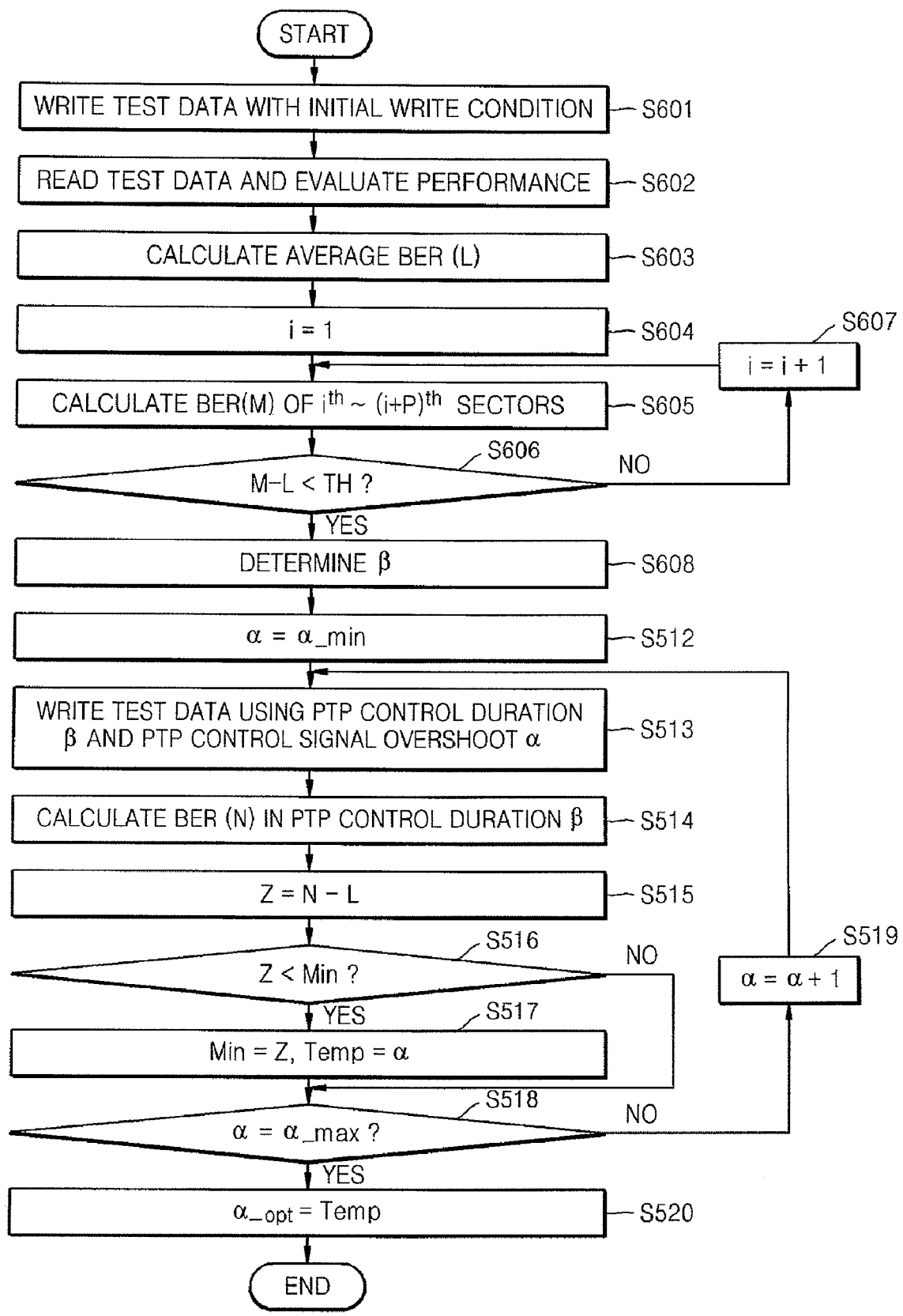
FIG. 6 is a flowchart illustrating an exemplary method of determining optimal values for a write current of a magnetic recording device according to another embodiment of the present general inventive concept.

FIG. 5 is a flowchart illustrating an exemplary method of determining optimal values for a write current according to an embodiment of the present invention. FIG. 6 is a flowchart illustrating an exemplary method of determining optimal values for a write current according to another embodiment of the present invention.

The method illustrated in FIG. 5 will be first explained in detail.

In operation S501, a track that is to be tested is selected and test data is written to the track with an initial write condition, e.g., known write current waveform parameters and a known data pattern. The to-be-tested track may be selected in an outer zone of the disk rather than an inner zone of the disk because a data transfer rate in the outer zone of the disk is higher than a data transfer rate in the inner zone of the disk. Additionally, the outer zone of the disk is more likely to suffer quality degradation during an initial write operation. The initial write condition uses a write current to produce a magnetic field optimized to when the pole tip protrusion of the magnetic head 70 has reached a steady state condition, such that the overshoot amplitude of the write current remains constant irrespective of the write time that has elapsed. An optimal write current and an optimal overshoot amplitude for when the pole tip protrusion of the magnetic head 70 has reached the steady state condition can be obtained by any suitable means.

In operation S502, the test data written to the track in operation S501 is read and the performance related to the PTP of the magnetic head 70 is evaluated. The PTP-related performance evaluation may be any technique to determine the quality of the data written as a function of the PTP, such as through a bit error rate (BER) or a channel statistic measurement (CSM), both of which are affected by the PTP.

For purposes of explanation and not limitation, the description below assumes PTP-related performance evaluation using the BER of the test data written, however it is to be understood that the present general inventive concept is not limited thereto, and various factors affected by PTP including the CSM can be used.

In operation S503, an average BER(L), where BER(L) indicates determining the BER and storing the value in a variable 'L', is calculated by detecting erroneous bits in the read test data. In the present embodiment, the average BER (L) is not obtained from a sector where the test data is initially written, but from a sector where the pole tip of the magnetic head 70 is known to have reached steady state. Consequently, the value 'L' stores a baseline value of the BER for the HDD.

In operation S504, counters (not illustrated) i and c internal to the controller 42 are initialized to 1 and 0, respectively. In certain embodiments, the counter i indicates a current sector position, and the counter c counts the number of sectors in which BER values continuously satisfy a threshold criterion. However, other units may be counted and evaluated such as a number of bits or units of time. The general inventive concept is not limited to the units of measurement described, as will be appreciated by the skilled artisan upon review of this disclosure.

In operation S505, a BER(M) of an $i^{th}$ sector is calculated.

In operation S506, it is determined whether a difference between the BER(M) of the $i^{th}$ sector and the average BER(L) satisfies the threshold criterion. That is, it is determined whether the difference between "M" of the $i^{th}$ sector and "L" is less than a threshold value TH. In the certain embodiments of the general inventive concept, the threshold value TH is a deviation of BER values corresponding to an allowable deviation of PTP values in the disk drive. However, it is to be understood that other threshold criteria may be used without deviating from the spirit of the general inventive concept.

When it is determined in operation S506 that the difference between the BER(M) of the $i^{th}$ sector and the average BER(L) is not less than the threshold value TH, the process proceeds to operation S509. In operation S509, the counter c is reset to zero (0). In operation S510, the counter i is increased by one, and the process returns to operation S505.

However, when it is determined in operation S506 that the difference between the BER(M) of the $i^{th}$ sector and the average BER(L) is less than the threshold value TH, the process proceeds to operation S507. In operation S507, the counter c is increased by one.

In operation S508, it is determined whether the counter c is equal to k, where k is a predetermined constant value. In certain embodiments, k is a reference value set to ensure that PTP has occurred. For example, the constant k may be 3, which means that three contiguous sectors must satisfy the threshold criterion as illustrated in operation S506 before it is accepted that PTP is fully in effect on the writing of data.

When it is determined in operation S508 that the counter c is not equal to the constant k, the process proceeds to operation S510. In operation S510, the counter i is increased by one, and the process returns to operation S505.

However, when it is determined in operation S508 that the counter c is equal to the constant k, the process proceeds to operation S511. In operation S511, a duration between a write start sector where the test data is initially written and a sector immediately preceding a write sector where the threshold criterion begins to be satisfied is determined as a PTP control duration β. In certain embodiments of the general inventive concept, a duration (i-k) is determined as the PTP control duration β. In other embodiments, the duration of a sector position indicated by the counter i is determined as the PTP control duration β. As stated above, the PTP control duration β may be determined in other units, such as a number of sectors, a number of bits written, or in units of time. Additionally, the PTP control duration β may be measured in one system of units, such as number of sectors, and then converted to another system, such as a length of time based on the rotational speed of the disk 20 and even the seek time of the magnetic head 70. The present general inventive concept is flexible as to the how the PTP control duration β is measured and calculated.

Figure 7:
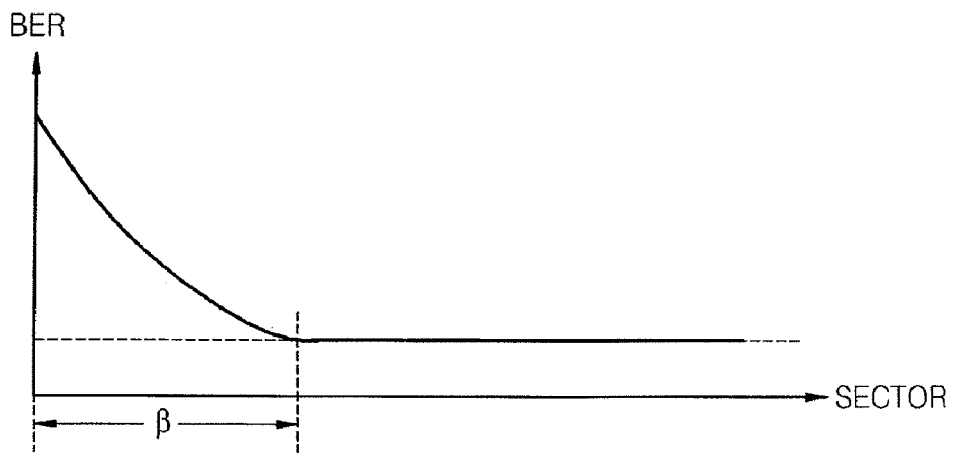
FIG. 7 is a graph illustrating a relationship between a bit error rate (BER) and a sector as time elapses.

When BER values are obtained from the sectors in which the test data is written as shown in FIG. 7, the PTP control duration β corresponds to a duration during which weak writing occurs due to the increased flying height of magnetic head 70 prior to the onset of the PTP.

The overshoot amplitude of a write current may be manipulated during the PTP control duration β in order to strengthen the magnetic field during over that duration to avoid weak writing in consideration of the PTP that occurs after an elapsed write time.

Figure 8:
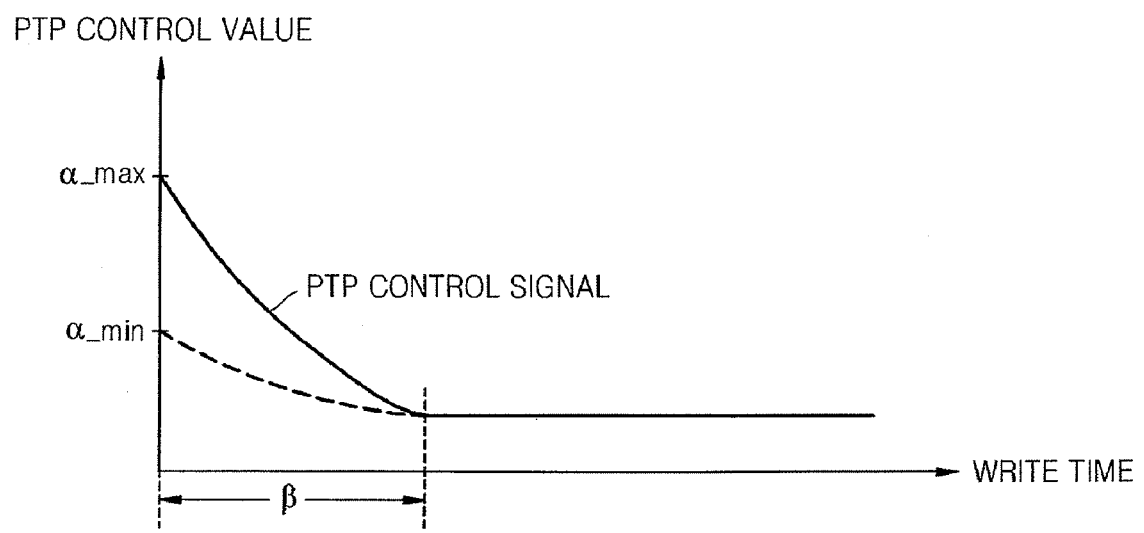
FIG. 8 is a graph illustrating a relationship between a PTP control value and a write time for explaining an exemplary method of determining a PTP control duration and an overshoot value of a PTP control signal.

In certain embodiments of the general inventive concept, a PTP control signal is generated to vary the overshoot amplitude of the write current during the PTP control duration β. FIG. 8 illustrates an exemplary PTP control signal that decreases over the PTP control duration β to reduce the overshoot amplitude of the write current as the write time elapses.

An overshoot value α of the PTP control signal in the exemplary embodiment is determined as follows.

The overshoot value α of the PTP control signal may be increased from a minimum value α_min to a maximum value α_max, and the optimal overshoot value α_opt of the PTP control signal may be selected as the overshoot value α when a PTP-related performance evaluation value measured in the PTP control duration β is most similar to a PTP-related performance evaluation value measured outside the PTP control duration β. The values of α_min and α_max may be determined by any suitable means to encompass a range of values over which the optimal value α_opt would be expected to fall.

An exemplary methodology to determine α_opt will now be explained in more detail.

Referring to FIG. 5, in operation S512, the overshoot value α of the PTP control signal is initially set to a minimum value α_min.

In operation S513, test data is written to the to-be-tested track of the disk 20 using an overshoot amplitude of a write current corresponding to the current set overshoot value α of the PTP control signal over the PTP control duration β determined in operation S511.

In operation S514, a BER(N) is calculated on the data written during the PTP control duration β. In certain embodiments of the general inventive concept, the BER(N) is an average of BER values in all sectors of the PTP control duration β. In other embodiments, in order to reduce a test time, a BER in a predetermined sector of the data written during PTP control duration β is set as the BER(N).

In operation S515, a difference Z between the BER(N) calculated in the PTP control duration β and the average BER(L) calculated outside the PTP control duration β is calculated.

In operation S516, the difference Z calculated in operation S515 is compared with a minimum value MIN. The minimum value MIN may be a maximum value of the difference Z that can be set as an initial value, where such maximum value may be determined by any suitable means.

When it is determined in operation S516 that the difference Z is less than the minimum value MIN, the process proceeds to operation S517. In operation S517, the minimum value MIN is set as the difference Z, and the overshoot value α of the PTP control signal at this time is stored in an register TEMP (not shown) internal to the controller 42.

However, when it is determined in operation S516 that the difference Z is not less than the minimum value MIN, the process proceeds to operation S518 by bypassing operation S517.

If operation S517 ends or it is determined in operation S516 that the difference Z is not less than the minimum value MIN, the process proceeds to operation S518. In operation S518, it is determined whether the currently set overshoot value α of the PTP control signal is equal to a maximum value α_max.

When it is determined in operation S518 that the currently set overshoot value α of the PTP control signal is not equal to the maximum value α_max, the process proceeds to operation S519. In operation S519, the overshoot value α of the PTP control signal is increased by one predetermined increment value, and the process returns to operation S513.

However, when it is determined in operation S518 that the currently set overshoot value α of the PTP control signal is equal to the maximum value α_max, the process proceeds to operation S520. In operation S520, the overshoot value α of the PTP control signal stored in the register TEMP is determined as an optimal overshoot value α_opt of the PTP control signal.

The optimal PTP control duration β and the optimal overshoot value α_opt of the PTP control signal can be determined in this manner.

A method of determining optimal values for a write current according to another embodiment of the present general inventive concept will now be explained with reference to FIG. 6. The embodiment illustrated in FIG. 6 can further reduce the process time that it takes to determine a PTP control duration β.

In operation S601, a track to be tested is selected and test data is written in the to-be-tested track with an initial write condition. The to-be-tested track and the write conditions are set in the same manner as explained in operation S501 illustrated in FIG. 5.

In operation S602, the test data written in operation S601 is read and the performance related to the PTP of the magnetic head 70 is evaluated. The PTP-related performance evaluation technique may be the same as those previously described, such as through a BER or a CSM, both of which are affected by the PTP.

For the purposes of explanation and not limitation, the exemplary process described below assumes the PTP-related performance evaluation will be the BER of the written data, however, as stated above, the present general inventive concept is not limited thereto, and other various factors affected by PTP including the CSM may be used.

In operation S603, an average BER(L) is calculated by detecting erroneous bits in the read test data. As described above, the average BER(L), in certain embodiments, is obtained from a sector where the pole tip of the magnetic head 70 has reached steady state.

In operation S604, a counter (not shown) i internal to the controller 42 is initialized to 1. In the present embodiment, the counter i indicates a sector position.

Figure 10:
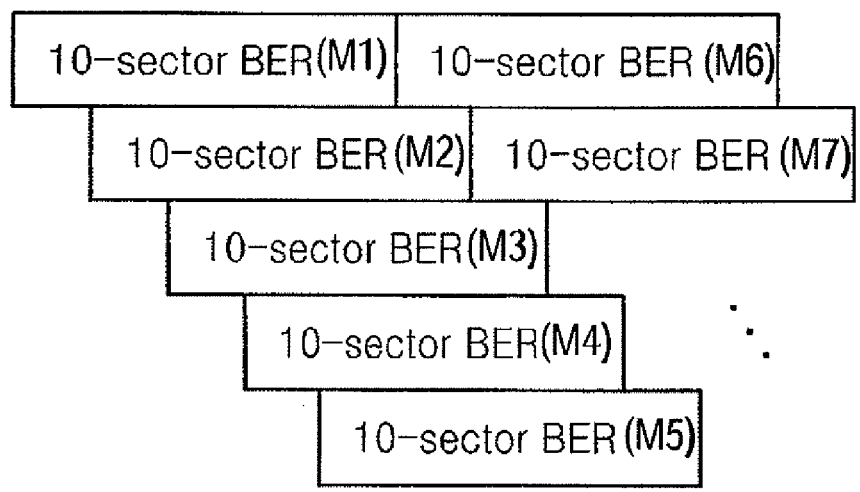
FIG. 10 is a diagram illustrating an example where a BER is calculated using 10 sectors as a unit in the method illustrated in FIG. 6.

In operation S605, a BER(M) is calculated using P sectors offset from an $i^{th}$ sector as a unit. If the value P is chosen too high, the test time that it takes to determine a PTP control duration can be reduced, but it is difficult to accurately determine a sector where weak writing ends. On the other hand, if the value P is low, the sector where there is weak writing due to the fact that PTP does not begin to generate can be more accurately determined, but the test time that it takes to determine the PTP control duration becomes longer. For that reason, moderate values for P should be selected. In certain embodiments, the value is set to 10 (P=10) and FIG. 10 is a diagram illustrating a case where a BER is calculated using 10 sectors as a unit when P=10.

In operation S606, it is determined whether a difference between the BER(M) calculated from the P sectors offset from the $i^{th}$ sector as a unit and the average BER(L) is less than a threshold value TH. The threshold value TH, as described above, may be a deviation of BER values corresponding to an allowable deviation of PTP values in a disk drive.

When it is determined in operation S606 that the difference between the BER(M) calculated from the P sectors offset from the $i^{th}$ sector as a unit and the average BER(L) is not less than the threshold value TH, the process proceeds to operation S607. In operation S607, the counter i is increased by one, and the process returns to operation S605.

However, when it is determined in operation S606 that the difference between the BER(M) calculated from the P sectors offset from the $i^{th}$ sector as a unit and the average BER(L) is less than the threshold value TH, the process proceeds to operation S608. In operation S608, a duration between a write start sector where the test data is initially written and a sector immediately preceding a write sector where a threshold criterion begins to be satisfied is determined as a PTP control duration β. That is, a sector duration (i−1) is determined as the PTP control duration β. In certain embodiments, the PTP control duration β is obtained by adding the value P to the value of a sector position indicated by the counter i, which is adds a certain margin to ensure an adequately long PTP control duration β.

Next, operations S512 through S520 for determining an overshoot value α of a PTP control signal are performed. Operations S512 through S520 illustrated in FIG. 6 may be performed through the same operations as S512 through S520 illustrated in FIG. 5, and thus a detailed explanation thereof will not be provided.

The optimal PTP control duration β and the optimal overshoot value α_opt of the PTP control signal may be determined by any of the exemplary processes described above or similar processes. The values of β and α_opt may be determined for each magnetic head 70 in the disk drive and stored for recall, for example, on the maintenance cylinder of the disk drive. The controller 42 may have a curve fit routine taking β and α_opt as parameters and may produce the correct PTP control value accordingly. The controller 42 may then calculate a PTP control value based on a write time in the PTP control duration β and the controller 42 may set the overshoot amplitude of a write current according to the calculated PTP control value. For example, the PTP control value may be determined as the overshoot amplitude of the write current the overshoot amplitude of the write current may be determined by multiplying a predetermined constant by the PTP control value.

According to the present general inventive concept, the PTP control duration and the overshoot value of the PTP control signal, which can control the overshoot amplitude of the write current of the disk drive, can be accurately determined. Consequently, weak writing during the initial write operation can be prevented, and the flying height of the magnetic head can be precisely maintained at a target height by precisely controlling the overshoot amplitude of the write current.

That is, according to the present invention, since the optimal overshoot amplitude of the write current and the optimal overshoot control duration can be determined according to each magnetic head, fatal data errors in a user environment, such as through weak writing, can be avoided and the performance of the HDD can be improved.

Furthermore, a reduction in the life and reliability of the magnetic head due to an excessive OSC can be prevented, and thus the life and reliability of the HDD can be improved.

The present general inventive concept may be implemented as a method, an apparatus, and a system of functional components in communication with one another. The present inventive concept may be executed on a processor as software, in which case the implementation includes code segments that perform the operations embodying the present general inventive concept. The programs or code segments can be stored in a processor-readable medium or transmitted by a computer data signal embodied in a carrier wave over a transmission medium or a communication network. The processor-readable medium includes any medium that can store or transmit information. The processor-readable medium may include, but is not limited to, an electronic circuit, a semiconductor memory device, a ROM, a flash memory, an erasable ROM (EROM), a floppy disk, an optical disk, a hard disk, a fiber-optic medium, and a radio frequency (RF) network system. The computer data signal includes any signal that can be transmitted over a transmission medium, e.g., an electronic network channel, an optical fiber, air, an electronic system, and an RF network.

Although a few embodiments of the present general inventive concept have been shown and described, it will be appreciated by those skilled in the art that changes may be made in these embodiments without departing from the principles and spirit of the general inventive concept, the scope of which is not defined by the descriptions above, but by the appended claims and their full range of equivalents.

What is claimed is:

1. A method of determining optimal values for a write current of a magnetic recording device, the method comprising:
   writing test data with an initial write condition and evaluating a performance related to the pole tip protrusion (PTP) of a magnetic head to detect a write sector where a performance evaluation value thereof begins to satisfy a threshold criterion;
   determining a PTP control duration defined as a duration between a write start sector where the test data is initially written and a sector immediately preceding the write sector where the performance evaluation value begins to satisfy the threshold criterion;
   varying an overshoot value of a PTP control signal that determines an overshoot amplitude of a write current and evaluating the PTP-related performance by applying the varied overshoot value of the PTP control signal over the determined PTP control duration; and
   selecting the overshoot value of a PTP control signal when a PTP-related performance evaluation value measured in the PTP control duration is most similar to a PTP-related performance evaluation value measured outside the PTP control duration.

2. The method of claim 1, wherein an overshoot amplitude of an initial write current used in the test data writing operation is determined as an optimal value obtained outside the PTP control duration.

3. The method of claim 1, wherein the PTP-related performance evaluation includes determining a bit error rate (BER).

4. The method of claim 1, wherein PTP-related performance evaluation includes determining a channel statistic measurement (CSM).

5. The method of claim 1, wherein test data writing operation comprises:
   writing test data with an initial write current in a specific region of a disk;
   reading the test data from a write start sector where the test data is initially written and evaluating the performance related to the PTP of the magnetic head; and
   detecting the write sector where the performance evaluation value begins to satisfy a threshold criterion.

6. The method of claim 5, wherein the threshold criterion is satisfied when a difference between an average BER that is calculated from a sector where the PTP of the magnetic head is in a steady state and a BER that is calculated from the write start sector is less than an initial threshold value.

7. The method of claim 5, wherein the threshold criterion is satisfied when a difference between an average CSM that is calculated from a sector where the PTP of the magnetic head is in a steady state and a CSM that is calculated from the write start sector is less than an initial threshold value.

8. The method of claim 5, wherein the write sector where the performance evaluation value begins to satisfy the threshold criterion is determined when a plurality of contiguous sectors satisfies the threshold criterion.

9. The method of claim 5, wherein test data reading operation comprises evaluating the PTP-related performance using a plurality of sectors as a unit as offset by one sector at a time.

10. The method of claim 1, wherein the overshoot value varying operation comprises:
    varying the overshoot value of a PTP control signal and applying the varied overshoot value of the PTP control signal over the determined PTP control duration to generate a PTP control value varying according to a write time;
    writing the test data with a write current having an overshoot amplitude in accordance with the PTP control value; and
    reading the test data in the PTP control duration and evaluating the PTP-related performance according to the overshoot value of the PTP control signal.

11. A processor-readable medium having encoded thereon processor-executable instructions to perform the method of claim 1.

12. A disk drive comprising:
    a disk on which information is stored;
    a magnetic head to magnetize the disk and to sense a magnetic field from the disk;
    a controller to determine a pole tip protrusion (PTP) control duration and an overshoot value of a PTP control signal controlling an overshoot amplitude of a write current so that a performance related to the PTP of the magnetic head is substantially constant from a write start sector irrespective of a write time that has elapsed; and
    a pre-amplifier to generate the write current having an overshoot amplitude determined by the value of the PTP control signal at a corresponding write time and to supply the generated write current to the magnetic head in a write mode, and to amplify an electrical signal sensed from the magnetic head in a read mode.

13. The disk drive of claim 12, wherein the PTP-related performance evaluation includes determining a bit error rate (BER).

14. The disk drive of claim 12, wherein the PTP-related performance evaluation includes a channel statistic measurement (CSM).

15. The disk drive of claim 12, wherein the controller comprises hardware and software to:
    write test data with an initial write condition and to evaluate the performance related to the PTP of the magnetic head to detect a write sector where a PTP-related performance evaluation value begins to satisfy a threshold criterion;
    determine a PTP control duration defined as a duration between the write start sector where the test data is initially written and a sector immediately preceding the write sector where the PTP-related performance evaluation value begins to satisfy the threshold criterion;

vary an overshoot value of a PTP control signal that determines an overshoot amplitude of a write current and to apply the varied overshoot value of the PTP control signal over the determined PTP control duration to evaluate the PTP-related performance; and determine the overshoot value when the PTP-related performance evaluation value measured in the PTP control duration is most similar to the performance evaluation value measured outside the PTP control duration.

16. The disk drive of claim 15, wherein the write sector where the performance evaluation value begins to satisfy the threshold criterion is determined when a plurality of contiguous sectors satisfy the threshold criterion.

17. The disk drive of claim 15, wherein the PTP-related performance is evaluated using a plurality of sectors as a unit offset by one sector at a time.

18. A method of ameliorating pole tip protrusion (PTP) effects of a magnetic head on data written to a magnetic medium, the method comprising:

writing test data on the magnetic medium with the magnetic head in an initial PTP state, the magnetic head having a write current provided thereto corresponding to a steady state of the PTP;

reading the test data with the magnetic head and determining therefrom a write time dependency of a quality of the test data; and controlling the write current supplied to the magnetic head for writing subsequent data in accordance with the write time dependency of the quality of the test data.

19. The method of claim 18 further including:

determining a PTP control signal and a PTP control duration for the write current from the write time dependency of the quality of the test data; and varying the write current supplied to the magnetic head for writing the subsequent data in accordance with the PTP control signal over the PTP control duration.

20. The method of claim 19, where determining the PTP control duration includes determining a write time from a position on the magnetic media where writing of the test data was initiated and a position on the magnetic media was where an error rate in the test data meets a threshold criterion.

21. The method of claim 20, where the position on the magnetic media is determined from a sector thereof.

22. The method of claim 19, where determining the PTP control signal includes:

setting at least one parameter defining the PTP control signal to an initial value;

writing the test data with the write current controlled by the PTP control signal;

reading the rewritten test data and determining therefrom an error rate in the test data;

modifying the at least one parameter of the PTP control signal upon a determination that the error rate fails to meet a threshold criterion; and rewriting the test data with the write current controlled by the modified PTP control signal and repeating the method at the rewritten test data reading step until the error rate meets the threshold criterion.

23. The method of claim 19 further including controlling an amount of overshoot in the write current with the PTP control signal.

24. A magnetic storage device comprising:

a magnetic medium to store data thereon; a magnetic head in spaced apart relationship with a surface of the magnetic medium to provide a magnetic flux at the surface of the magnetic medium to define the data thereon, the magnetic flux at the surface of the magnetic medium having a time-dependent variation when a constant current is provided to the magnetic head;

a controller to determine the time-dependent variation of the magnetic flux and to control an amount of current provided to the magnetic head over time to produce the magnetic flux at the surface of the magnetic medium exclusive of the time-dependent variation.

25. The magnetic storage device of claim 24, wherein the controller determines a control period over which the magnetic flux varies before reaching a steady state and generates a variable control signal over the control period to control the amount of current.

26. The magnetic storage device of claim 24, wherein the controller determines the time-dependent variation of the magnetic flux by providing the constant current to the magnetic head and determining a time-dependent quality of the data stored on the magnetic medium thereby.

27. The magnetic storage device of claim 24, wherein the controller provides the variable control signal through a waveform to control at least one variable parameter of the current provided to the magnetic head.

28. The magnetic storage device of claim 27, wherein the at least one variable parameter includes an overshoot of the current at a data position on the magnetic medium.

* * * * *